(No Model.) 2 Sheets—Sheet 1.

G. F. SIMONDS.
BALL BEARING.

No. 434,475. Patented Aug. 19, 1890.

Witnesses:
J. A. Rutherford
Peter B. Hills

Inventor:
George F. Simonds
By James L. Norris
Attorney

THE NORRIS PETERS CO., PHOTO-LITHO., WASHINGTON, D. C.

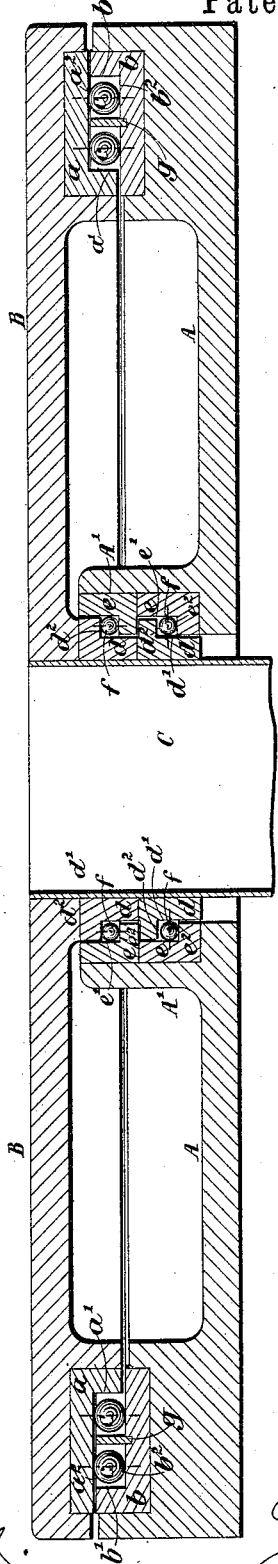

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,475, dated August 19, 1890.

Application filed January 2, 1890. Serial No. 335,695. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to ball-bearings for facilitating the movement of rotating platforms, turn-tables, turrets, and other heavy bodies or structures by diminishing the friction between the rotating and the non-rotating parts.

My said invention comprises the combination, with the said rotating and non-rotating parts, of inner and outer rings or annular pieces of nearly the same diameter as the said parts and having arranged between them one or more circular series or groups of spherical rollers or balls, and inner and outer rings of much smaller diameter having arranged between them one or more circular series or groups of spherical rollers or balls. The said rings or annular pieces are provided with concentric and plane surfaces, which form annular channels or cavities for the balls. The balls between the larger rings bear against and roll upon the plane surfaces of the said rings, the concentric surfaces serving to retain the balls in place, and being a sufficient distance apart to allow the said balls to rotate freely between them. One of the said rings is preferably fitted into a suitable recess in the base-plate or non-rotating part, the other ring being fitted into a suitable recess in the turn-table or rotating part. When two or more concentric series or groups of balls are arranged between the said rings, I combine therewith suitable hoops for separating the balls of one series from those of another series. The balls between the rings or annular pieces of smaller diameter support the turn-table or other rotating body at or near the center thereof. When a central pivot is employed, the said rings or annular pieces surround the said central pivot. I prefer to combine with the bails and rings for supporting the turn-table, turret, or the like, at or near its center, one or more circular series or groups of balls arranged between rings or annular pieces for resisting lateral movement of the said turn-table, turret, or the like relatively to the base-plate.

Figure 1:
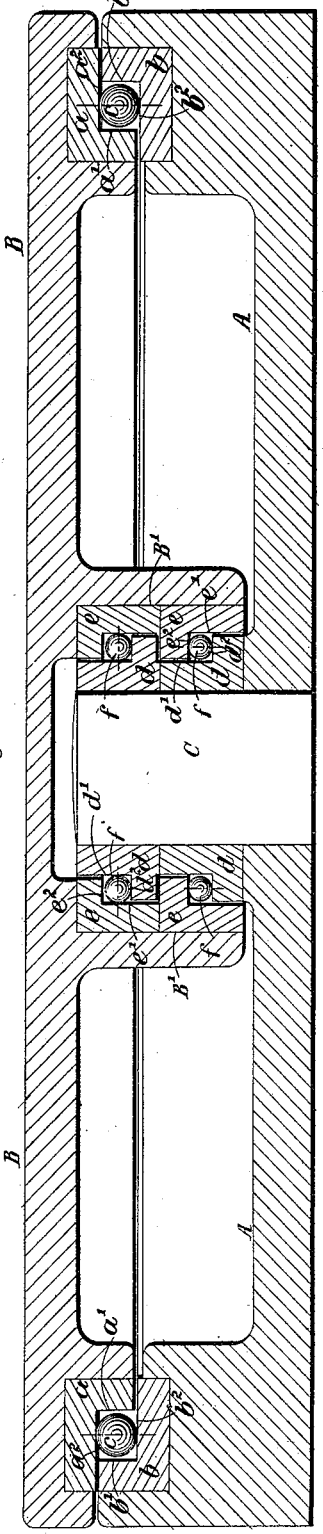
Figure 2:
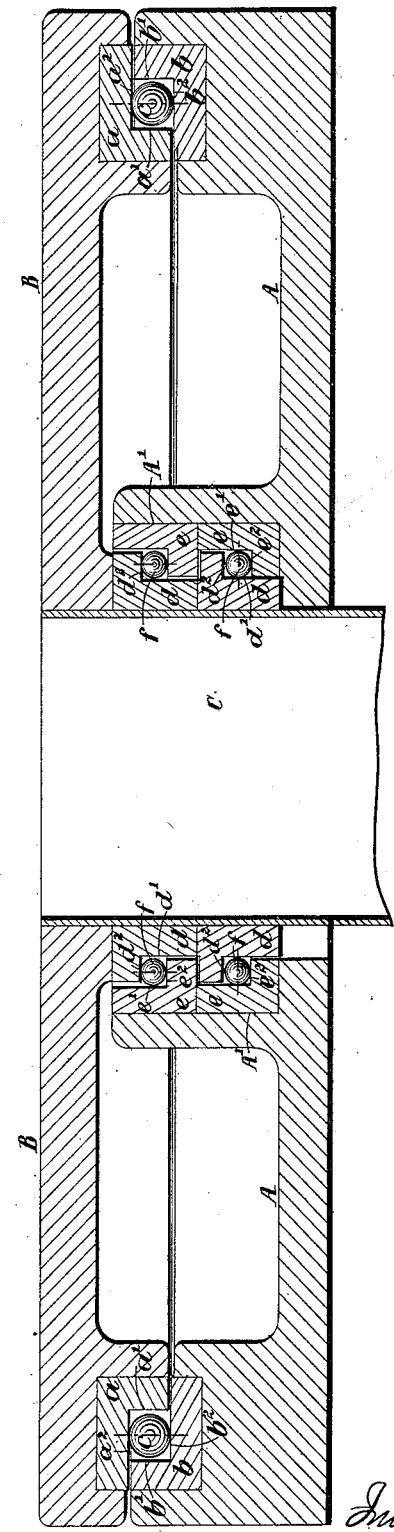

In the accompanying drawings, Figure 1 is a vertical central section showing one form of my improved apparatus. Fig. 2 is a similar view showing another form or modification thereof; and Fig. 3 is a similar view showing a further modification thereof.

A is the base-plate; B, the lower portion of a turn-table or other rotating body or structure.

C is the central pivot.

$a\ b$ are inner and outer rings or annular pieces, the diameter of which is nearly equal to that of the said base-plate and turn-table, and between which are arranged the spherical rollers or balls $c$ for supporting the turn-table near its periphery.

$d\ e$ are inner and outer rings or annular pieces of much smaller diameter arranged in pairs with balls $f$ between them and surrounding the central pivot C.

The rings $a\ b$ are formed with concentric surfaces $a'\ b'$ and with plane bearing-surfaces $a^2\ b^2$, which are parallel to each other and perpendicular to the said concentric surfaces. The ring $a$ is fitted and secured in a suitable annular recess or cavity in the turn-table B, and the ring $b$ is fitted and secured in a suitable annular recess or cavity in the base-plate A. These rings may be conveniently and advantageously formed in sections or segments of steel suitably hardened or tempered, the said segments being so formed that when placed in the said recesses or cavities they will abut against each other and form a complete ring.

The rings or annular pieces $d\ e$ are formed with concentric surfaces $d'\ e'$ and with plane surfaces $d^2\ e^2$, which are parallel to each other and perpendicular to the said concentric surfaces. I prefer to use two pairs of these rings or annular pieces, one of the said pairs being so arranged that the balls bear against and roll upon the plane surfaces, and thus serve to support the turn-table, and the other pair being so arranged that the balls bear against and roll upon the concentric surfaces and thus resist lateral movement of the turn-table relatively to the base-plate. It is obvious, however, that I can, if desired, use one or any other suitable number of pairs of the said rings or annular pieces d e.

In the apparatus shown in Fig. 1 the rings d are fixed upon the central pivot C, which is firmly secured in the base-plate A, and the rings e are fitted and secured in a recess or cavity B' in the turn-table B. The balls between the lower rings d e serve to support the turn-table, while those between the upper rings d e serve to resist lateral movement of the turn-table relatively to the central pivot. To indicate more clearly which of the balls support the turn-table and which of them serve to prevent lateral movement, dotted lines are drawn through the points of contact of the balls with the plane and concentric surfaces respectively.

In the apparatus shown in Fig. 2 the central pivot C consists of a tube, which is firmly secured in and rotates with the turn table B. The rings d are fixed on this tube, and the rings e are fitted and secured in a recess or cavity A' in the base-plate A. This modification of my invention is very advantageous in the case of gun-mountings, in which a central tube is employed for raising the ammunition from a magazine below into the loading position behind the breech of the gun.

In Fig. 3 I have shown another modification of my invention, wherein I employ between the rings or annular pieces a b two concentric series or groups of balls c and a hoop g, for separating the butts of one series from those of the other series. This hoop may be advantageously formed in sections and fitted in a groove or recess in the ring b as shown. It is obvious that, if desired, I can use a larger number of concentric series of balls c with hoops g between them.

It will be seen that my improved apparatus is so constructed that there is no liability to the entrance of water into the spaces between the rings or annular pieces. Moreover, the bearing-surfaces can be efficiently hardened and finished with great facility before the parts are put together. By my improvements I afford the means for greatly facilitating the rotation of heavy turn-tables or turrets and for enabling such rotation to be easily performed, notwithstanding the rolling or pitching of the ship in which the turn-table or turret is mounted.

It is obvious that my said invention is also applicable to heavy cranes and other ponderous structures which require to be supported in such a manner that they can be freely rotated.

Certain features of construction shown and described, but not claimed in this application, are shown, described, and claimed in applications filed by me, Serial Nos. 335,694, 337,118, 331,639, 336,402, and 336,701.

What I claim is—

1. A ball-bearing for supporting a turn-table, turret, or similar structure, comprising a circular series or group of balls arranged between rings or annular pieces at or near the center of the said turn-table or other structure and of the base-plate or foundation for supporting the same, and a circular series or group of balls arranged between rings or annular pieces at or near the periphery of the said turn-table or other structure and base-plate or foundation, the balls of one of the said series or groups bearing against and rolling upon concentric surfaces on the corresponding rings and the balls of the other series or group bearing against plane surfaces on the corresponding rings, substantially as and for the purposes set forth.

2. A ball-bearing for supporting a turn-table, turret, or similar structure, comprising a circular series of spherical rollers or balls arranged between concentric surfaces on the turn-table, turret, or similar structure, and the base-plate or foundation at or near the center thereof, and a circular series of spherical rollers or balls arranged between plane surfaces at or near the periphery of the said turn-table, turret, or similar structure, substantially as hereinbefore described.

3. The combination, with a turn-table, turret, or similar structure, and a base-plate or foundation for supporting the same, of rings or annular pieces, one of which is fitted and secured in a recess or cavity near the periphery of the turn-table or other structure, and the other of which is fitted and secured in a corresponding recess or cavity in the base-plate, and which are formed with concentric surfaces and with plane bearing-surfaces parallel to each other and perpendicularly to the said concentric surfaces, spherical rollers or balls arranged between the said rings or annular pieces, and a pair of rings or annular pieces with balls between them for supporting the said turn-table or other structure at or near the center thereof, substantially as and for the purposes set forth.

4. The combination, with a turn-table having a central pivot, of rings or annular pieces having concentric and plane surfaces, between which is an annular space or channel and fitted and secured in the base-plate and turn-table near the periphery thereof, balls arranged in the space or channel between the said rings or annular pieces, similar rings or annular pieces surrounding the said central pivot, and having balls arranged in the annular space or channel between them, substantially as and for the purposes set forth.

5. The combination, with two rings or annular pieces secured, respectively, to the base-plate and turn-table near the periphery thereof, and having balls arranged between them, of two rings or annular pieces secured, respectively, to the said base-plate and turn-table at or near the center thereof, and having balls arranged between them for supporting the said turn-table, and two rings or annular pieces secured, respectively, to the said base-plate and turn-table, and having balls arranged between them for resisting lateral movement of the said turn-table relatively to the base-plate, substantially as and for the purposes set forth.

6. The combination of the base-plate A, the turn-table B, the rings or annular pieces $a\ b$, having the concentric surfaces $a'\ b'$ and the plane surfaces $a^2\ b^2$, and secured, respectively, in the said base-plate and turn-table at or near the periphery thereof, the balls $c$, arranged between the said rings, the rings or annular pieces $d\ e$, having the concentric surfaces $d'\ e'$ and the plane surfaces $d^2\ e^2$ and surrounding the pivot C, and the balls $f$, arranged between the said rings $d\ e$, all substantially as and for the purposes set forth.

7. The combination of the base-plate A, the turn-table B, the rings or annular pieces $a\ b$, having the concentric surfaces $a'\ b'$ and the plane surfaces $a^2 b^2$, and secured, respectively, in the said base-plate and turn-table at or near the periphery thereof, the balls $c$, arranged between the said rings, the rings or annular pieces $d\ e$, having the concentric surfaces $d'\ e'$ and the plane surfaces $d^2\ e^2$ and surrounding the pivot C, and the balls $f$, arranged between the said rings $d\ e$, all substantially as and for the purposes set forth.

8. The combination of the base-plate A, the turn-table B, the rings or annular pieces $a\ b$, having the concentric surfaces $a'\ b'$ and the plane surfaces $a^2 b^2$, and secured, respectively, in the said base-plate and turn-table at or near the periphery thereof, the balls $c$, arranged in concentric series or groups between the said rings, the hoops $g$, arranged between the said series or groups of balls, the rings or annular pieces $d\ e$, having the concentric surfaces $d'\ e'$ and the plane surfaces $d^2\ e^2$ and surrounding the pivot C, and the balls $f$, arranged between the said rings $d\ e$, all substantially as and for the purposes set forth.

In testimony whereof I have hereunto signed my name in the presence of two subscribing witnesses.

GEORGE FREDERICK SIMONDS.

Witnesses:
   DAVID YOUNG,
   CHAS. B. BURDON.